(12) United States Patent
Camacho Martinez

(10) Patent No.: US 11,414,358 B2
(45) Date of Patent: Aug. 16, 2022

(54) METHOD OF COMBINING NUTRIENTS FOR STRENGTHENING PLANTS THROUGH A LIQUID FERTILIZER

(71) Applicant: Guerman Camacho Martinez, Modesto, CA (US)

(72) Inventor: Guerman Camacho Martinez, Modesto, CA (US)

( * ) Notice: Subject to any disclaimer, the term of this patent is extended or adjusted under 35 U.S.C. 154(b) by 0 days.

(21) Appl. No.: 16/949,425

(22) Filed: Oct. 29, 2020

(65) Prior Publication Data

US 2021/0122683 A1    Apr. 29, 2021

Related U.S. Application Data

(60) Provisional application No. 62/927,536, filed on Oct. 29, 2019.

(51) Int. Cl.
| | |
|---|---|
| C05G 1/00 | (2006.01) |
| C05F 11/02 | (2006.01) |
| C05G 5/23 | (2020.01) |
| C05D 1/00 | (2006.01) |
| C05C 11/00 | (2006.01) |

(52) U.S. Cl.
CPC ............... *C05G 1/00* (2013.01); *C05C 11/00* (2013.01); *C05D 1/00* (2013.01); *C05F 11/02* (2013.01); *C05G 5/23* (2020.02)

(58) Field of Classification Search
None
See application file for complete search history.

(56) References Cited

U.S. PATENT DOCUMENTS

| | | | |
|---|---|---|---|
| 3,114,625 A * | 12/1963 | Higuchi | C05B 1/02 71/37 |
| 3,197,300 A * | 7/1965 | Tomioka | C05C 5/00 71/24 |
| 3,328,158 A | 6/1967 | Marks | |
| 3,630,710 A | 12/1971 | Frederickson | |
| 4,127,964 A | 12/1978 | Mee | |
| 4,743,287 A * | 5/1988 | Robinson | C05F 11/02 71/21 |
| 4,919,702 A | 4/1990 | Weltzien et al. | |
| 5,034,045 A | 7/1991 | Alexander | |
| 5,393,317 A | 2/1995 | Robinson | |
| 5,538,530 A | 7/1996 | Heaton et al. | |
| 5,731,265 A * | 3/1998 | Hou | A01G 7/04 504/121 |
| 5,876,479 A | 3/1999 | Hedgpeth, IV | |
| 5,976,210 A | 11/1999 | Sensibaugh | |
| 6,051,043 A | 4/2000 | Kitten | |
| 6,878,179 B2 | 4/2005 | Porubcan | |
| 8,048,190 B2 | 11/2011 | Valencia | |
| 8,758,472 B2 | 6/2014 | Blandy | |
| 8,778,048 B2 | 7/2014 | Huang et al. | |
| 8,778,135 B2 | 7/2014 | Li et al. | |
| 9,738,567 B1 * | 8/2017 | Taganov | C05F 11/10 |
| 10,259,754 B2 * | 4/2019 | Merritt | C09K 17/14 |

(Continued)

FOREIGN PATENT DOCUMENTS

CN          106588313 A  *  4/2017

*Primary Examiner* — Wayne A Langel
(74) *Attorney, Agent, or Firm* — Dunlap Bennett & Ludwig, PLLC

(57) ABSTRACT

A method of composing a concentrated liquid fertilizer for growing and repairing unhealthy plants.

2 Claims, 2 Drawing Sheets

(56) References Cited

U.S. PATENT DOCUMENTS

| | | | | |
|---|---|---|---|---|
| 2010/0154498 A1* | 6/2010 | Valencia | ............... | C05D 9/02 |
| | | | | 71/23 |
| 2010/0261605 A1* | 10/2010 | Monahan | ............... | C05F 17/10 |
| | | | | 504/101 |
| 2011/0077155 A1* | 3/2011 | Goodwin | ............... | C05C 9/005 |
| | | | | 504/101 |
| 2011/0286799 A1* | 11/2011 | de la Garza | ............ | C05D 3/02 |
| | | | | 405/128.5 |
| 2012/0060573 A1* | 3/2012 | Posner | ............... | C05D 3/00 |
| | | | | 71/23 |
| 2013/0133386 A1* | 5/2013 | Baker | ............... | C05F 17/50 |
| | | | | 71/10 |
| 2014/0179520 A1* | 6/2014 | Haschemeyer | ......... | C05F 11/00 |
| | | | | 504/101 |
| 2017/0327429 A1 | 11/2017 | Rezai et al. | | |

* cited by examiner

METHOD OF COMBINING NUTRIENTS FOR STRENGTHENING PLANTS THROUGH A LIQUID FERTILIZER

CROSS-REFERENCE TO RELATED APPLICATION

This application claims the benefit of priority of U.S. provisional application No. 62/927,536, filed 29 Oct. 2019, the contents of which are herein incorporated by reference.

BACKGROUND OF THE INVENTION

The present invention relates to fertilizers and, more particularly, a method of combining nutrients for growing and strengthening plants through the administration of the resulting liquid fertilizer product, where positive results manifest in a shorter amount of time as compared to current fertilizers.

All plants must overcome the challenges of sustaining healthy growth, regardless of their environment. Fertilizers aid in this effort. Currently fertilizing products, however, require repeated administration of separate components over an extended time in order to repair and strengthen an unhealthy plant. The purveyors of today's fertilizers have designed their multi-component products so as to demand the repeated purchase of the separate components over an extended period of time.

As can be seen, there is a need for a method of combining nutrients for growing and strengthening plants through the administration of the resulting liquid fertilizer product, where positive results manifest in a shorter amount of time as compared to current fertilizers.

The present invention embodies a liquid fertilizer product that results from a specific blending process of two components and water so that users will not need to buy multiple constituent nutrients over an extended period of time in order to achieve sustainable results, and the results will manifest twice as quickly as compared to current fertilizer products. The fertilizer product of the present invention incorporates natural humic acid and nitrogen in a novel blending process that results in a liquid fertilizer that enable plants to grow strong and healthy in a couple of days, improving the plant's health and strength in a sustainable way.

SUMMARY OF THE INVENTION

In one aspect of the present invention, a method of making a concentrated liquid fertilizer, the method includes: dissolving an effective amount of nitrogen in a predetermined amount of water to form a first admixture; and mixing an effective amount of a natural humic acid to the first admixture in such a way as to form a homogeneous second admixture, wherein the resulting fertilizer will contain approximately 9.90% organic nitrogen and approximately 0.04% of the natural humic acid, wherein the natural humic acid includes a first portion of phosphate and a second potion of potash at an approximately 1:3 ratio, respectively.

In another aspect of the present invention, the method of making a concentrated liquid concentrated fertilizer includes adding water to the homogeneous second admixture until a desired viscosity of liquid fertilizer is realized.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method of mixing two over-the-counter components into a fertilizer product in a unique manner any novice could employ in forming a liquid fertilizer for growing and repairing unhealthy plants quickly.

Figure 1:
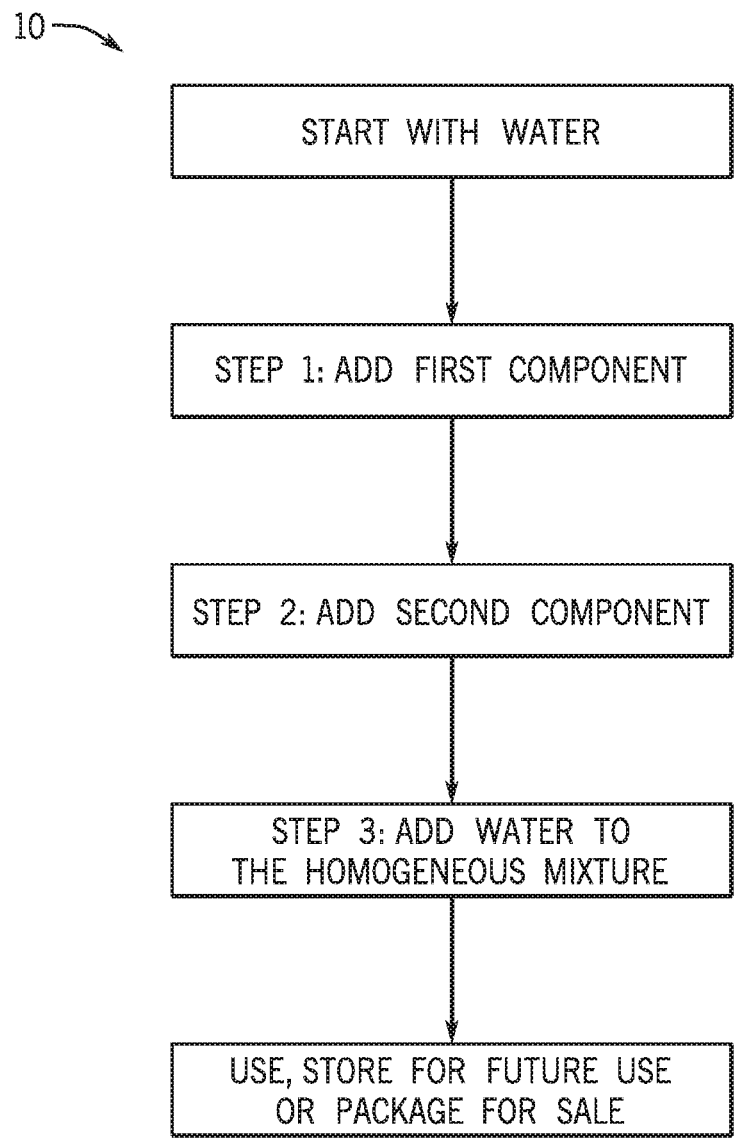
FIG. 1 is a flow chart of an exemplary embodiment of the present invention.
Figure 2:
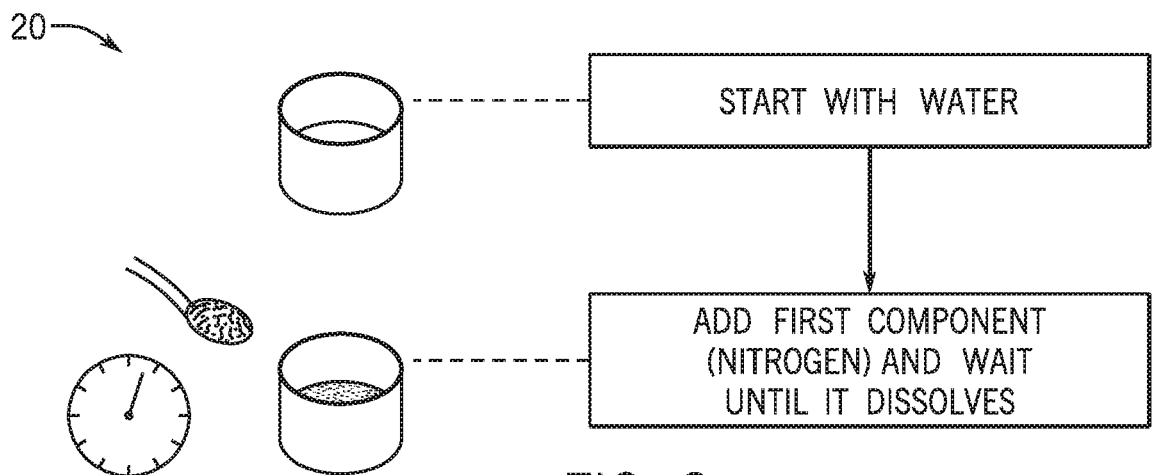
FIG. 2 is a schematic view of an exemplary embodiment of Step 1 of the present invention.
Figure 3:
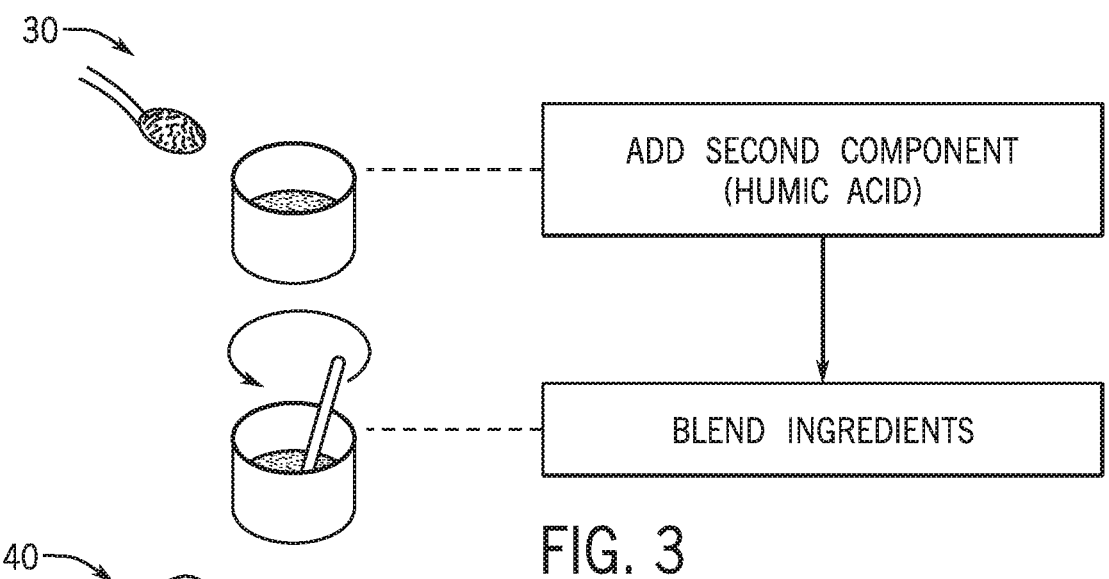
FIG. 3 is a schematic view of an exemplary embodiment of Step 2 of the present invention.
Figure 4:
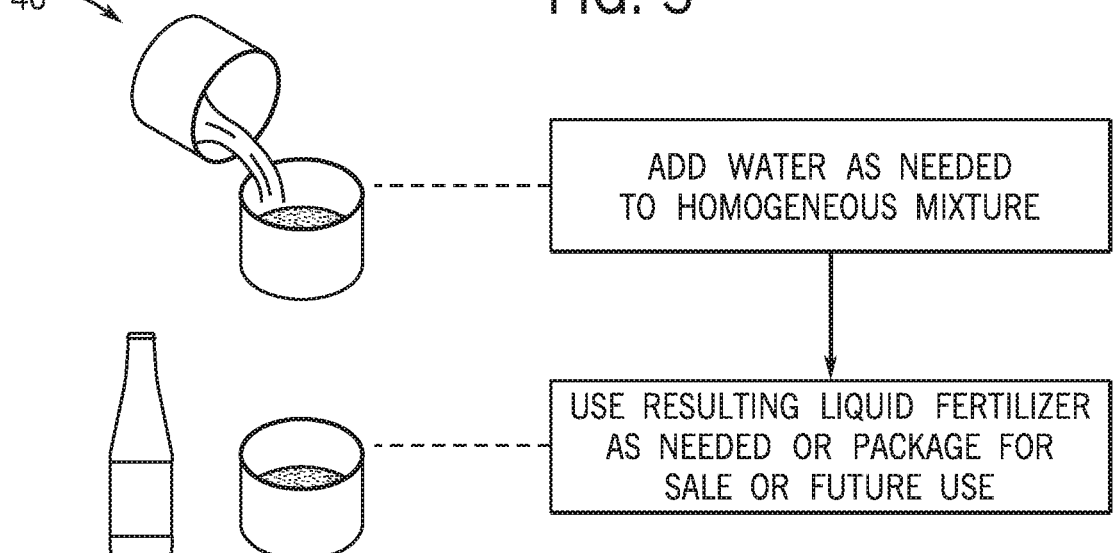
FIG. 4 is a schematic view of an exemplary embodiment of Step 3 of the present invention.

Referring now to FIGS. 1 through 4, the present invention embodies a method and system 10 of combining and blending constituent components for growing and strengthening plants through the user-friendly administration of the resulting liquid fertilizer product where positive results manifest in a shorter amount of time as compared to current fertilizers.

The constituent components include only nitrogen, natural humic acid, and water. In step 1, 20, a user may add nitrogen to water and wait until it dissolves to form a first admixture. Once the nitrogen is dissolved, in step 2, 30, the user may add the natural humic acid to the first admixture, forming a homogeneous second admixture. The natural humic acid may be a mixture or compound of phosphate and potash at approximately a 1:3 ratio. In step 3, 40, the user may add water to the homogeneous second admixture, forming the innovative liquid fertilizer product. The user may add the water slowly so it can blend in and become the liquid fertilizer product that is easily administered.

The inventor has established the resulting, blended liquid fertilizer product helps to grow all plants strong and healthy in a very short time. A would-be user need only purchase nitrogen and natural humic acid over the counter to form the liquid fertilizer product embodied by the present invention. The user would then simply administer the resulting liquid fertilizer product to the roots of a plant followed by water to see positive, healthy results.

The resulting concentrated liquid fertilizer will contain approximately 9.90% (ranging between 8.90% and 11.0%) organic nitrogen, approximately 0.01% (ranging between 0.005% and 0.05%) organic phosphate, and approximately 0.03% organic potash (0.01% and 0.10%), with the remaining percentage being water.

It should be understood, of course, that the foregoing relates to exemplary embodiments of the invention and that modifications may be made without departing from the spirit and scope of the invention as set forth in the following claims.

What is claimed is:

1. A method of making a concentrated liquid fertilizer, the method consisting of:

dissolving an amount of elemental nitrogen in an amount of water to form a first admixture; and mixing an amount of a humic acid to the first admixture in such a way as to form a homogeneous second admixture containing approximately 9.90% organic nitrogen and approximately 0.04% of the humic acid.

2. The method of claim 1, wherein the humic acid comprises a first portion of phosphate and a second portion of potash at an approximately 1:3 ratio, respectively.

* * * * *